United States Patent
Spyrou

(10) Patent No.: US 8,829,146 B2
(45) Date of Patent: Sep. 9, 2014

(54) HIGH-REACTIVITY, URETDIONE-CONTAINING POLYURETHANE COMPOSITIONS WHICH COMPRISE METAL-FREE ACETYLACETONATES

(75) Inventor: Emmanouil Spyrou, Schermbeck (DE)

(73) Assignee: Evonik Degussa GmbH, Essen (DE)

( * ) Notice: Subject to any disclaimer, the term of this patent is extended or adjusted under 35 U.S.C. 154(b) by 422 days.

(21) Appl. No.: 12/990,138

(22) PCT Filed: Jun. 12, 2009

(86) PCT No.: PCT/EP2009/057260
§ 371 (c)(1),
(2), (4) Date: Oct. 28, 2010

(87) PCT Pub. No.: WO2009/156282
PCT Pub. Date: Dec. 30, 2009

(65) Prior Publication Data
US 2011/0039030 A1    Feb. 17, 2011

(30) Foreign Application Priority Data
Jun. 27, 2008    (DE) .......................... 10 2008 002 703

(51) Int. Cl.
*C08G 18/08*    (2006.01)
*C08G 18/79*    (2006.01)
*C08G 18/42*    (2006.01)
*C08G 18/18*    (2006.01)
*C09D 175/06*    (2006.01)

(52) U.S. Cl.
CPC .......... *C08G 18/798* (2013.01); *C08G 2150/20* (2013.01); *C08G 18/42* (2013.01); *C08G 18/1875* (2013.01); *C09D 175/06* (2013.01)
USPC ................... 528/51; 528/48; 528/52; 528/59; 528/60; 528/76; 528/80; 528/85

(58) Field of Classification Search
USPC ................. 528/59, 60, 80, 76, 85, 48, 51, 52; 427/389, 393.5, 393, 389.7, 388.1
See application file for complete search history.

(56) References Cited

U.S. PATENT DOCUMENTS

| 4,044,171 | A | * | 8/1977 | Muller et al. .................. 427/485 |
| 4,413,079 | A | * | 11/1983 | Disteldorf et al. ............. 524/169 |
| 4,912,210 | A | * | 3/1990 | Disteldorf et al. ............. 540/202 |
| 4,929,724 | A | * | 5/1990 | Engbert et al. ................. 540/202 |
| 6,914,115 | B2 | | 7/2005 | Spyrou et al. |
| 7,300,997 | B2 | | 11/2007 | Wenning et al. |
| 7,307,135 | B2 | | 12/2007 | Spyrou |
| 7,572,876 | B2 | | 8/2009 | Spyrou et al. |
| 7,709,589 | B2 | | 5/2010 | Spyrou et al. |
| 2005/0096451 | A1 | | 5/2005 | Spyrou |
| 2005/0239956 | A1 | | 10/2005 | Spyrou et al. |
| 2007/0282089 | A1 | | 12/2007 | Spyrou |
| 2008/0015274 | A1 | * | 1/2008 | Burdeniuc et al. ............. 521/118 |
| 2008/0097025 | A1 | * | 4/2008 | Spyrou et al. ................. 524/590 |
| 2008/0171816 | A1 | | 7/2008 | Spyrou et al. |
| 2008/0265201 | A1 | | 10/2008 | Spyrou et al. |
| 2010/0249310 | A1 | | 9/2010 | Spyrou |
| 2010/0263792 | A1 | | 10/2010 | Spyrou et al. |

FOREIGN PATENT DOCUMENTS

EP    1 878 493    1/2008

OTHER PUBLICATIONS

International Search Report issued Oct. 13, 2009 in PCT/EP09/057260 filed Jun. 12, 2009.

* cited by examiner

*Primary Examiner* — Michael L Leonard
(74) *Attorney, Agent, or Firm* — Oblon, Spivak, McClelland, Maier & Neustadt, L.L.P.

(57) ABSTRACT

The invention relates to high-reactivity polyurethane compositions which contain uretdione groups and cure at low baking temperatures, to a process for the preparation and to their use for producing coating materials, especially surface coatings and adhesives, and also plastics.

19 Claims, No Drawings

HIGH-REACTIVITY, URETDIONE-CONTAINING POLYURETHANE COMPOSITIONS WHICH COMPRISE METAL-FREE ACETYLACETONATES

This application is a U.S. National Phase application under 35 U.S.C. §119 (a)-(d) of German Patent Application No. 1-2008 002 703.0 filed Jun. 27, 2008, the disclosure of which is incorporated herein by reference in its entirety.

The invention relates to high-reactivity polyurethane compositions which contain uretdione groups and cure at low baking temperatures, to a process for the preparation and to their use for producing coating materials, especially surface coatings and adhesives, and also plastics.

Externally or internally blocked polyisocyanates represent valuable crosslinkers for thermally crosslinkable polyurethane (PU) coating and adhesive compositions.

Thus, for example, DE-A 27 35 497 describes PU coatings with outstanding weathering stability and thermal stability. The crosslinkers whose preparation is described in DE-A 27 12 931 are composed of ε-caprolactam-blocked isophorone diisocyanate containing isocyanurate groups. Also known are polyisocyanates containing urethane, biuret or urea groups, whose isocyanate groups are likewise blocked.

The drawback of these externally blocked systems lies in the elimination of the blocking agent during the thermal crosslinking reaction. Since the blocking agent may thus be emitted to the environment it is necessary on ecological and workplace safety grounds to take particular measures to clean the outgoing air and to recover the blocking agent. The crosslinkers, moreover, are of low reactivity. Curing temperatures above 170° C. are required.

DE-A 30 30 539 and DE-A 30 30 572 describe processes for preparing polyaddition compounds which contain uretdione groups and whose terminal isocyanate groups are irreversibly blocked with monoalcohols or monoamines. Particular drawbacks are the chain-terminating constituents of the crosslinkers, which lead to low network densities in the PU surface coatings and hence to moderate solvent resistances.

Hydroxyl-terminated polyaddition compounds containing uretdione groups are subject matter of EP 0 669 353. On account of their functionality of two they exhibit improved resistance to solvents. Compositions based on these polyisocyanates containing uretdione groups share the feature that, during the curing reaction, they do not emit any volatile compounds. At not less than 180° C., however, the baking temperatures are situated at a high level.

The use of amidines as catalysts in PU coating compositions is described in EP 0 803 524. Although these catalysts do lead to a reduction in the curing temperature, they exhibit considerable yellowing, which is generally unwanted in the coatings sector. The cause of this yellowing is presumed to be the reactive nitrogen atoms in the amidines. They are able to react with atmospheric oxygen to form N-oxides, which are responsible for the discoloration.

EP 0 803 524 also mentions other catalysts which have been used to date for this purpose, but without indicating any particular effect on the curing temperature. Such catalysts include the organometallic catalysts known from polyurethane chemistry, such as dibutyltin dilaurate (DBTL), or else tertiary amines, such as 1,4-diazabicyclo[2.2.2]octane (DABCO), for example.

WO 00/34355 claims catalysts based on metal acetylacetonates, an example being zinc acetylacetonate. Such catalysts are actually capable of lowering the curing temperature of polyurethane powder coating compositions containing uretdione groups (M. Gedan-Smolka, F. Lehmann, D. Lehmann "New catalysts for the low temperature curing of uretdione powder coatings" International Waterborne, High solids and Powder Coatings Symposium, New Orleans, 21-23 Feb. 2001). The use of metals in articles of everyday use, however, has become increasingly controversial on toxicological grounds; cf. the development of tributyltin catalysts.

It was an object of the present invention, therefore, to find high-reactivity polyurethane compositions containing uretdione groups which can be cured even at very low temperatures and are especially suitable for producing plastics and also for producing high-gloss or matt, light-stable and weather-stable coatings of high reactivity, especially for coating compositions and adhesive compositions. At the same time, however, for reasons of toxicology and workplace safety, no transition metals ought to be used. Moreover, after curing, the polyurethane compositions must exhibit good coatings properties.

Surprisingly it has been found that the purely organic catalysts of the invention accelerate the re-elimination of uretdione groups to such an extent that, when components containing uretdione groups are used, the curing temperature of polyurethane compositions can be lowered considerably.

Conventional coating and adhesive compositions containing uretdione groups can be cured under normal conditions (DBTL catalysis) only at 180° C. or above (Pieter Gillis de Lange, Powder Coatings and Technology, Vincentz Verlag, 2004, section 3.3.2.2 p. 119).

With the aid of the high-reactivity polyurethane compositions of the invention, which therefore cure at a low temperature, it is possible, at a curing temperature of 100 to 160° C., not only to save on energy and cure time but also to bond or coat many temperature-sensitive substrates which at 180° C. would exhibit unwanted yellowing, decomposition and/or embrittlement phenomena. Besides metal, glass, wood, leather, plastics and MDF boards, certain aluminium substrates as well are ideally suited. In the case of the aluminium substrates, an excessively high temperature load sometimes leads to an unwanted change in the crystal structure.

The present invention provides high-reactivity polyurethane compositions containing uretdione groups, substantially containing A) at least one compound which contains uretdione groups, based on aliphatic, (cyclo)aliphatic and/or cycloaliphatic polyisocyanates and hydroxyl-containing compounds, having a free NCO content of less than 5% by weight and a uretdione content of 2% to 25% by weight, in an amount of 5% to 99% by weight, based on the total mass of the components and B) at least one catalyst selected from a quaternary ammonium acetylacetonate and/or phosphonium acetylacetonate, in an amount of 0.2% to 5% by weight, based on the total mass of the components, C) if desired, a hydroxyl-containing polymer having an OH number of between 20 and 500 KOH/gram, in an amount of 1% to 90% by weight, based on the total mass, of the components;

D) if desired, at least one compound which is reactive towards acid groups, with a weight fraction, based on the total mass of the components, of 0.1% to 10%;

E) if desired, at least one acid in monomeric or polymeric form, in a weight fraction, based on the total mass of the components, of 0.1% to 10%;

F) if desired, solvents;

G) if desired, auxiliaries and additives.

The invention also provides a process for preparing polyurethane compositions in heatable assemblies at temperatures below 130° C.

The invention also provides for the use of the polyurethane compositions of the invention for producing coating compositions on metal, plastic, glass, wood, MDF (Middle Density Fibre Boards) or leather substrates or other heat-resistant substrates.

The invention also provides for the use of the polyurethane compositions of the invention as adhesive compositions for adhesive bonds of metal, plastic, glass, wood, MDF or leather substrates or other heat-resistant substrates.

Likewise provided by the invention are metal-coating compositions, especially for automobile bodies, motorbikes and bicycles, architectural components and household appliances, wood-coating compositions, MDF coatings, glass-coating compositions, leather-coating compositions and plastic-coating compositions.

High-reactivity in the context of this invention means that the polyurethane compositions of the invention containing uretdione groups cure at temperatures of 100 to 160° C., according to the nature of the substrate.

Preferably this curing temperature is 120 to 150° C., more preferably from 130 to 140° C. The curing time of the polyurethane composition of the invention is within 5 to 30 minutes.

Polyisocyanates containing uretdione groups, as starting compounds for component A), are well known and are described in, for example, U.S. Pat. No. 4,476,054, U.S. Pat. No. 4,912,210, U.S. Pat. No. 4,929,724 and EP 0 417 603. A comprehensive overview of industrially relevant processes for dimerizing isocyanates to uretdiones is supplied by J. Prakt. Chem. 336 (1994) 185-200. Generally speaking, conversion of isocyanates to uretdiones takes place in the presence of soluble dimerization catalysts, such as dialkylaminopyridines, trialkylphosphines, phosphoramides or imidazoles, for example. The reaction, carried out optionally in solvents but preferably in their absence, is terminated by addition of catalyst poisons when a desired conversion has been reached. Excess monomeric isocyanate is separated off afterwards by short-path evaporation. If the catalyst is sufficiently volatile, the reaction mixture can be freed from the catalyst at the same time as monomer is separated off. In that case there is no need to add catalyst poisons. In principle a broad range of isocyanates is suitable for the preparation of polyisocyanates containing uretdione groups. In accordance with the invention isophorone diisocyanate (IPDI), hexamethylene diisocyanate (HDI), 2,2'-dicyclohexyl-methane diisocyanate/2,4'-dicyclohexyl-methane diisocyanate/4,4'-dicyclohexyl-methane diisocyanate ($H_{12}MDI$), 2-methylpentane diisocyanate (MPDI), 2,2,4-tri-methylhexamethylene diisocyanate/2,4,4-trimethylhexamethylene diisocyanate (TMDI), norbornane diisocyanate (NBDI), alone or in mixtures, are present. Very particular preference is given to IPDI, $H_{12}MDI$ and HDI.

The conversion of these polyisocyanates carrying uretdione groups into compounds containing uretdione groups (curing agents) A) entails the reaction of the free NCO groups with hydroxyl-containing monomers or polymers, such as polyesters, polythioethers, polyethers, polycaprolactams, polyepoxides, polyesteramides, polyurethanes or low molecular mass di-, tri- and/or tetraalcohols as chain extenders, and, if desired, monoamines and/or monoalcohols as chain terminators, and has been frequently described in the past (EP 0 669 353, EP 0 669 354, DE 30 30 572, EP 0 639 598 or EP 0 803 524). Preferred compounds containing uretdione groups (curing agent) A) have a free NCO content of less than 5% by weight and a uretdione group content of 2% to 25% by weight (calculated as $C_2N_2O_2$, molecular weight 84), preferably of 6% to 25% by weight. Preferred chain extenders are polyesters and monomeric dialcohols. Besides the uretdione groups, the compounds (curing agents) A) may also contain isocyanurate, biuret, allophanate, urethane and/or urea structures.

The invention also provides for the use of quaternary ammonium acetylacetonates or phosphonium acetylacetonates as a catalyst in polyurethane coating compositions, especially in coating and adhesive or sealant compositions.

The catalysts B) essential to the invention are quaternary ammonium acetyl-acetonates or phosphonium acetylacetonates.

Examples of such catalysts are tetramethylammonium acetylacetonate, tetraethyl-ammonium acetylacetonate, tetrapropylammonium acetylacetonate, tetrabutyl-ammonium acetylacetonate, benzyltrimethylammonium acetylacetonate, benzyltri-ethylammonium acetylacetonate, tetramethylphosphonium acetylacetonate, tetra-ethylphosphonium acetylacetonate, tetrapropylphosphonium acetylacetonate, tetra-butylphosphonium acetylacetonate, benzyltrimethylphosphonium acetylacetonate, benzyltriethylphosphonium acetylacetonate.

It is of course also possible to use mixtures of such catalysts. The catalysts are present in an amount of 0.2% to 5% by weight, preferably 0.4% to 3% by weight, based on the total mass of the components, in the polyurethane composition. The catalysts may contain water of crystallization, in which case this is not taken into account when calculating the amount of catalyst employed—that is, the amount of water is subtracted. Particular preference is given to using tetraethylammonium acetylacetonate and tetrabutylammonium acetylacetonate.

One variant of the invention includes the polymeric attachment of such catalysts B) to the compounds (curing agent) A) or to the hydroxyl-containing polymers C). Thus, for example, free alcohol groups, thio groups or amino groups of the ammonium salts can be reacted with acid groups, isocyanate groups or glycidyl groups of the compounds (curing agents) A) or hydroxyl-containing polymers C), in order to ingegrate the catalysts B) into the polymeric system. Moreover, these catalysts can be surrounded with an inert shell and hence encapsulated.

In the case of the hydroxyl-containing polymers C) it is preferred to use polyesters, polyethers, polyacrylates, polyurethanes, polyamideamines, polyethers and/or polycarbonates having an OH number of 20 to 500 (in mg KOH/gram). Particular preference is given to polyesters having an OH number of 30 to 150, an average molecular weight of 500 to 6000 g/mol and an acid number of 3 to 10 mg KOH/g. Such binders have been described in, for example, EP 0 669 354 and EP 0 254 152. Polymers of this kind may be amorphous, crystalline or partly crystalline. It is of course also possible to use mixtures of such polymers.

Reactive acid-scavenging compounds D) are common knowledge in coatings chemistry. Thus, for example, epoxy compounds, carbodiimides, hydroxyalkylamides or 2-oxazolines, and also basic salts, such as hydroxides, hydrogen carbonates or carbonates, react with acid groups at elevated temperatures. Suitable examples in this context include triglycidyl ether isocyanurate (TGIC), EPIKOTE® 828 (diglycidyl ether based on Bisphenol A, Shell), Versatic acid glycidyl esters, ethylhexyl glycidyl ether, butyl glycidyl ether, Polypox R 16 (pentaerythritol tetraglycidyl ether, UPPC AG) and other Polypox products with free epoxy groups, hydroxyalkylamide (Vestagon EP HA 320, Evonik Degussa GmbH), but also phenylenebisoxazoline, 2-methyl-2-oxazoline, 2-hydroxyethyl-2-oxazoline, 2-hydroxypropyl-2-oxazoline, 5-hydroxypentyl-2-oxazoline, sodium carbonate and calcium carbonate. Mixtures of such substances are of course also suitable. Epoxy compounds are preferred. These reactive compounds can be used in weight fractions of 0.1% to 10%, preferably 0.5% to 3%, based on the total mass of the components.

Acids specified under E) are all substances, solid or liquid, organic or inorganic, monomeric or polymeric, which possess the properties of a Brønsted acid or Lewis acid. Examples that may be mentioned include the following: sulphuric acid, acetic acid, benzoic acid, malonic acid, terephthalic acid, and also copolyesters or copolyamides having an acid number of at least 20.

Suitable solvents under F) are all liquid substances which do not react with other ingredients; examples are acetone, ethyl acetate, butyl acetate, xylene, Solvesso 100, Solvesso 150, methoxypropyl acetate and Dibasic esters.

In accordance with the invention it is possible to add the additives G) which are customary in coatings or adhesives technology, such as flow control agents, polysilicones or acrylates for example, light stabilizers, sterically hindered amines for example, or other auxiliaries, as described in EP 0 669 353, for example, in a total amount of 0.05% to 5% by weight. Fillers and pigments such as titanium dioxide, for example, can be added in an amount of up to 50% by weight of the overall composition.

The homogenization of all of the constituents for producing the polyurethane composition of the invention may take place in suitable assemblies, such as heatable stirred tanks, kneaders (compounders) or else extruders, for example, in the course of which upper temperature limits of 120 to 130° C. ought not to be exceeded. The thoroughly mixed mass is applied to the substrate by suitable application, examples being rolling, spraying, injecting, dipping and knifecoating. Following application, the coated workpieces are cured by heating to a temperature of 60 to 220° C. for 4 to 60 minutes, preferably at 80 to 160° C. for 6 to 30 minutes.

The subject matter of the invention is illustrated with examples below.

EXAMPLES

1. Starting Materials

| Starting materials | Product description, manufacturer |
|---|---|
| VESTAGON BF 9030 | Component A), Evonik Degussa GmbH, Coatings & Colorants, uretdione content: 12.4%, softening point: 74-75° C., $T_g$: 40-50° C. |
| TBAHS | Tetrabutylammonium hydrogen sulphate, Aldrich |
| ARALDIT PT912 | Component D), acid scavenger, Huntsman |
| CRYLCOAT 2939 | Component C), polyester, OHN 52 mg KOH/g, Tg 54° C., AN: 3.1 mg KOH/g, Cytec |
| Benzoin | Degassing agent, Aldrich |
| KRONOS 2160 | Titanium dioxide, Kronos |
| RESIFLOW PV 88 | Flow control agents, Worlee |

$T_g$: glass transition point; OHN: OH number, AN: acid number

2. Preparation of the Catalyst Tetrabutylammonium Acetylacetonate (TBAacac) by Literature Method (Tetrahedron, 30, (1974), pp 93-104)

25 g of acetylacetone are dissolved in 100 ml of dichloromethane and a solution of 20 g of NaOH and 85 g of TBAHS in 250 ml of water is added. This mixture is placed in a shaking funnel and shaken vigorously. The organic phase is separated off over sodium sulphate. After the solvent has been stripped off, the product is washed with cold acetone and dried in a vacuum drying cabinet at 40° C. This gives a yellow solid having a melting point of 148° C. (Lit.: 150° C.).

3. Pure Polyurethane Base Compositions (Figures in % by weight):

| Examples | VESTAGON BF 9030 | TBAacac |
|---|---|---|
| 1 | 98.5 | 1.5 |
| 2* | 100 | — |

*non-inventive, comparative example 98.5 g of Vestagon BF 9030 are dissolved in 300 ml of acetone and 1.5 g of TBAacac are added. The solvent is stripped on a rotary evaporator and the solid is ground and sieved off to a particle size of <100 μm. Thereafter the powder is sprayed electrostatically on to a standard steel panel and is cured at 150° C. for 30 minutes. For comparison the same procedure is carried out with pure Vestagon BF 9030.

| Examples | MEK test | Pendulum hardness | Remarks |
|---|---|---|---|
| 1 | >100 | 185 | cured |
| 2* | 3 | not measurable | not cured |

*non-inventive, comparative example

Inventive Example 1 is fully cured. Comparative Example 2* is not cured.

4. Powder Coating (Figures in % by weight)

| Examples | VESTAGON BF 9030 | CRYLCOAT 2839 | PT 912 | TBAacac |
|---|---|---|---|---|
| 3 | 25.20 | 41.10 | 1.5 | 0.7 |
| 4* | 24.95 | 40.65 | 1.5 | — |

Examples 3 and 4 each additionally contain 0.5% of benzoin, 1.0% by weight of RESIFLOW PV 88 and 30.0% by weight of KRONOS 2160.
*non-inventive, comparative example Examples 3 and 4 were sprayed electrostatically on to steel panels and heated at 130° C. for 30 minutes.

| Examples | MEK test | Ball impact dir/rev [inch* lbs] | Indentation [mm] | Remarks |
|---|---|---|---|---|
| 3 | >100 | 160/160 | >10 | cured |
| 4* | 7 | 20/>10 | 0.5 | not cured |

*non-inventive, comparative example

Inventive Example 3 is fully cured and has good mechanical coatings properties. Comparative Example 4* is not cured at all.

The invention claimed is:
1. A polyurethane composition comprising:
A) 5% to 99% by weight of the composition, a polyurethane compound which comprises a uretdione group, wherein the polyurethane compound A) consists of a reaction product of at least one of an aliphatic polyisocyanate comprising a uretidione group, a (cyclo)aliphatic polyisocyanate comprising a uretidione group, and a cycloaliphatic polyisocyanate comprising a uretidione group with at least one of a dialcohol, trialcohol and tetraalcohol, a free NCO content of the polyurethane compound A) is less than 5% by weight, and a uretdione content of the polyurethane compound A) is 2% to 25% by weight, and B) 0.2% to 5% by weight of the composition of at least one catalyst selected from the group consisting of a quaternary ammonium acetylacetonate and a phosphonium acetylacetonate.

2. The polyurethane composition of claim 1, further comprising at least one component selected from the group consisting of:

C) a hydroxyl-comprising polymer having an OH number of between 20 and 500 KOH/gram, in an amount of 1% to 90% by weight of the composition;

D) a compound which is reactive towards an acid group, in an amount of 0.1% to 10% by weight of the composition;

E) at least one acid in monomeric or polymeric form, in an amount of 0.1% to 10% by weight of the composition;

F) a solvent;

G) an auxiliary; and

H) an additive.

3. The polyurethane composition of claim 1, wherein the at least one polyurethane compound A) comprises as an isocyanate component at least one diisocyanate compound selected from the group of compounds consisting of isophorone diisocyanate (IPDI), hexamethylene diisocyanate (HDI), 2,2'-dicyclohexylmethane diisocyanate, 2,4'-dicyclohexylmethane diisocyanate, 4,4'-dicyclohexylmethane diisocyanate ($H_{12}$MDI), 2-methylpentane diisocyanate (MPDI), 2,2,4-trimethylhexamethylene diisocyanate, 2,4,4-trimethylhexamethylene diisocyanate (TMDI), and norbornane diisocyanate (NBDI).

4. The polyurethane composition of claim 3, wherein the diisocyanate component is at least one of IPDI, 4,4'-$H_{12}$MDI and HDI.

5. The polyurethane composition of claim 1, wherein a monomeric dialcohol is reacted with at least one of an aliphatic polyisocyanate comprising a uretidione group, a (cyclo)aliphatic polyisocyanate comprising a uretidione group, and a cycloaliphatic polyisocyanate comprising a uretidione group.

6. The polyurethane composition of claim 1, wherein the catalyst B) is at least one compound selected from the group consisting of tetramethylammonium acetylacetonate, tetraethylammonium acetylacetonate, tetrapropylammonium acetylacetonate, tetrabutylammonium acetylacetonate, benzyltrimethylammonium acetylacetonate, benzyltriethylammonium acetylacetonate, tetramethylphosphonium acetylacetonate, tetraethylphosphonium acetylacetonate, tetrapropylphosphonium acetylacetonate, tetrabutylphosphonium acetylacetonate, benzyltrimethylphosphonium acetylacetonate, and benzyltriethylphosphonium acetylacetonate.

7. The polyurethane composition of claim 6, wherein the catalyst B) is at least one of tetraethylammonium acetylacetonate and tetrabutylammonium acetylacetonate.

8. The polyurethane composition of claim 2, which comprises the hydroxyl-polymer C) and the polymer C) is selected from the group of polymers consisting of a hydroxyl-comprising polyester, a hydroxyl-comprising polyether, a hydroxyl-comprising polyacrylate, a hydroxyl-comprising polyurethane, a hydroxyl-comprising polyamideamine, a hydroxyl-comprising polyether, and a hydroxyl-comprising polycarbonate.

9. The polyurethane composition of claim 8, wherein the polymer C) is a hydroxyl-comprising polyester having an OH number of 30 to 150, and an average molecular weight of 500 to 6000 g/mol.

10. The polyurethane composition of claim 2, which comprises the compound which is reactive towards an acid group D) and the compound D) is at least one compound selected from the group consisting of an epoxy compound, a carbodiimide, a hydroxyalkylamide, a basic 2-oxazoline, and a basic salt.

11. The polyurethane composition of claim 2, which comprises the acid E) and the acid E) is at least one selected from the group consisting of sulphuric acid, acetic acid, benzoic acid, malonic acid, terephthalic acid, and a copolyester or a copolyamide having an acid number of at least 20.

12. A process for preparing the polyurethane composition of claim 1, the process comprising heating the composition in an assembly at a temperature below 130° C.

13. A process for manufacturing a coating or adhesive composition, the process comprising adding the polyurethane composition according to claim 1 to a coating or adhesive composition precursor.

14. A process for coating metal, plastic, wood, glass, MDF, leather, or another heat-resistant substrate, the process comprising applying the composition of claim 1 to a surface thereof and heating.

15. A coated metal having a coating comprising the cured polyurethane composition of claim 1.

16. A coated wood having a coating comprising the cured polyurethane composition of claim 1.

17. A coated leather comprising the cured polyurethane composition of claim 1.

18. A coated plastic comprising the polyurethane composition of claim 1.

19. A process for manufacturing a polyurethane coating, adhesive, or sealant composition, the process comprising adding the polyurethane composition of claim 1 to a polyurethane coating, adhesive, or sealant composition.

* * * * *